(12) United States Patent
Migliore

(10) Patent No.: US 8,161,698 B2
(45) Date of Patent: Apr. 24, 2012

(54) FOUNDATION FOR MONOPOLE WIND TURBINE TOWER

(75) Inventor: Paul Gerald Migliore, Arvada, CO (US)

(73) Assignee: AnemErgonics, LLC, Arvada, CO (US)

( * ) Notice: Subject to any disclaimer, the term of this patent is extended or adjusted under 35 U.S.C. 154(b) by 226 days.

(21) Appl. No.: 12/069,445

(22) Filed: Feb. 8, 2008

(65) Prior Publication Data

US 2008/0190058 A1 Aug. 14, 2008

Related U.S. Application Data

(60) Provisional application No. 60/900,287, filed on Feb. 8, 2007.

(51) Int. Cl.
*E02D 27/50* (2006.01)
*E02D 27/42* (2006.01)
*E04H 12/00* (2006.01)

(52) U.S. Cl. ............ 52/295; 52/296; 52/169.9; 52/649.4

(58) Field of Classification Search .............. 52/169.9, 52/169.13, 170, 649.3, 649.4, 40, 295, 296; 343/875; 174/45 R; 416/DIG. 6
See application file for complete search history.

(56) References Cited

U.S. PATENT DOCUMENTS

| | | | | |
|---|---|---|---|---|
| 874,395 A * | 12/1907 | Danielson | ..................... | 52/649.4 |
| 943,550 A * | 12/1909 | Hughes | ........................... | 256/52 |
| 1,008,209 A * | 11/1911 | Skinner | ........................ | 52/649.4 |
| 1,008,210 A * | 11/1911 | Skinner | ........................... | 52/260 |
| 1,033,916 A * | 7/1912 | McProud | ........................ | 52/296 |
| 1,052,990 A * | 2/1913 | Zillgitt | ............................. | 52/155 |
| 1,409,217 A * | 3/1922 | Kardong | ...................... | 52/649.4 |
| 1,425,805 A * | 8/1922 | Strauss | ........................... | 104/94 |
| 1,436,577 A * | 11/1922 | Cvetkovich | ................... | 52/649.8 |
| 1,585,254 A * | 5/1926 | Halvor et al. | ................... | 52/698 |
| 1,596,669 A * | 8/1926 | Ligonnet | ..................... | 52/649.4 |
| 1,624,237 A * | 4/1927 | Hanna | .......................... | 362/431 |
| 1,919,491 A * | 7/1933 | Waggoner | .................... | 52/649.4 |
| 2,374,624 A * | 4/1945 | Schwendt | .................... | 52/223.5 |
| 2,587,724 A * | 3/1952 | Henderson | ................... | 52/649.2 |
| 2,630,075 A * | 3/1953 | Omsted | ......................... | 104/125 |
| 2,706,498 A * | 4/1955 | Upson | ........................ | 285/290.4 |
| 2,995,900 A * | 8/1961 | Hunsucker | .................... | 405/203 |
| 3,110,982 A * | 11/1963 | Besinger | ........................ | 52/301 |
| 3,184,893 A * | 5/1965 | Booth | ........................ | 52/741.15 |
| 3,245,190 A * | 4/1966 | Reiland | ........................ | 52/649.3 |
| 3,472,031 A * | 10/1969 | Kelso | ............................ | 405/275 |
| 3,552,073 A * | 1/1971 | Millerbernd | ..................... | 52/98 |
| 3,662,559 A * | 5/1972 | Swift | ........................... | 405/225 |
| 3,668,876 A * | 6/1972 | Koehler | ......................... | 405/227 |
| 3,918,229 A * | 11/1975 | Schweinberger | ............... | 52/295 |
| 3,957,087 A * | 5/1976 | Johnston | ....................... | 138/178 |
| 4,047,356 A * | 9/1977 | DePirro | ....................... | 52/749.1 |
| 4,079,930 A * | 3/1978 | Schiron et al. | .................. | 482/30 |
| 4,272,929 A * | 6/1981 | Hanson | ............................ | 52/40 |
| 4,296,060 A * | 10/1981 | Killmeyer et al. | ............. | 264/137 |
| 4,570,409 A * | 2/1986 | Wilks | ......................... | 52/741.15 |

(Continued)

*Primary Examiner* — Brian Glessner
*Assistant Examiner* — Joseph J Sadlon
(74) *Attorney, Agent, or Firm* — Holland & Hart LLP

(57) ABSTRACT

An innovation is disclosed which relates to a wind turbine foundation. A circular foundation using fiber reinforced concrete has optional circular reinforcement rods. The foundation includes a vertical stanchion that rests in the bottom of an excavated hole and supports anchor bolts and reinforcement bars in a predetermined configuration while concrete is poured into the hole. All the necessary foundation materials can be combined in a simple and compact kit which can be shipped to a customer.

18 Claims, 10 Drawing Sheets

U.S. PATENT DOCUMENTS

| | | | |
|---|---|---|---|
| 4,618,287 A * | 10/1986 | Kinnan | 405/232 |
| 4,646,495 A * | 3/1987 | Chalik | 52/236.8 |
| 5,218,805 A * | 6/1993 | Rex | 52/295 |
| 5,320,452 A * | 6/1994 | Kunito | 405/233 |
| 5,362,542 A * | 11/1994 | Ozawa et al. | 428/70 |
| 5,460,231 A * | 10/1995 | Collins | 175/258 |
| 5,533,835 A * | 7/1996 | Angelette | 405/229 |
| 5,826,387 A * | 10/1998 | Henderson et al. | 52/295 |
| 6,123,485 A * | 9/2000 | Mirmiran et al. | 405/252 |
| 6,264,402 B1 * | 7/2001 | Vickars et al. | 405/239 |
| 6,390,734 B1 * | 5/2002 | Marshall | 405/230 |
| 6,536,170 B2 * | 3/2003 | Stuever | 52/299 |
| 6,540,196 B1 * | 4/2003 | Ellsworth | 248/548 |
| 6,581,349 B1 * | 6/2003 | Riley | 52/454 |
| 6,612,085 B2 * | 9/2003 | Edwards et al. | 52/649.1 |
| 6,652,195 B2 * | 11/2003 | Vickars et al. | 405/239 |
| 6,659,691 B1 * | 12/2003 | Berry | 405/231 |
| 6,685,399 B2 * | 2/2004 | Iemura et al. | 405/256 |
| 6,851,231 B2 * | 2/2005 | Tadros et al. | 52/223.4 |
| 7,275,351 B2 * | 10/2007 | Knepp | 52/848 |
| 7,475,518 B2 * | 1/2009 | Suehiro | 52/745.21 |
| 7,493,735 B2 * | 2/2009 | Yin | 52/649.4 |
| 7,546,720 B2 * | 6/2009 | Leary | 52/745.17 |
| 7,735,273 B2 * | 6/2010 | Knepp et al. | 52/294 |
| 7,841,143 B2 * | 11/2010 | Jensen et al. | 52/296 |
| 2005/0117977 A1 * | 6/2005 | Rasumussen | 405/253 |
| 2007/0256377 A1 * | 11/2007 | Rizzotto | 52/295 |
| 2008/0016795 A1 * | 1/2008 | George et al. | 52/169.9 |
| 2008/0236075 A1 * | 10/2008 | Andersen | 52/297 |
| 2008/0244996 A1 * | 10/2008 | Gillespie et al. | 52/169.9 |

* cited by examiner

FOUNDATION FOR MONOPOLE WIND TURBINE TOWER

RELATED APPLICATIONS

This application claims priority under 35 U.S.C. 119(e) to U.S. Provisional Patent Application No. 60/900,287 which was filed on Feb. 8, 2007 and which is incorporated herein by reference.

FIELD OF THE INVENTION

The invention relates to a wind turbine foundation. Specifically the invention relates to the design of a foundation kit for monopole towers used with small and residential-scale wind turbines.

BACKGROUND OF THE INVENTION

Wind turbines are renewable energy devices that are being deployed in greater numbers as awareness grows of fossil fuels' disadvantages. The largest percentage of installed cost for wind turbines—certainly for small wind turbines—is attributable to towers and foundations. Development of innovative towers and foundations that have the potential for simplifying turbine installation and reducing cost, will promote more widespread deployment. Of particular interest are free-standing (no guy wires or ancillary supports) monopole towers. They are favored for their visual appeal and maintenance simplicity, but are more costly than guyed towers.

Traditional turbine foundations use a square cross section of the foundation, which is not an efficient shape. While the entire block contributes mass that is useful in resisting the applied overturning moment, the moment arm to the corners can not be assumed because there is no a priori assurance of the loading direction. The corners of the block are essentially wasted space and materials. It would be advantageous to provide a tower foundation created in a shape with no wasted space and materials, resulting in a lower cost.

Another aspect of prior art towers that adds to the cost of installation is having the entire top of the foundation aboveground. This requires extensive forms to create the desired shape and structure, necessitating more materials, design, and labor to install. It would be advantageous to provide a tower foundation which does not require extensive forms to create an above-ground portion.

These towers must have stringently engineered bases able to withstand the forces presented by the turbine and tower. The standard method is to use structurally reinforced concrete. Prior art used grids of rebar manually fastened together, set in concrete, to provide the structure and support. This method is very time consuming and costly. The possibility of error during the fabrication is also significant. It would be advantageous to provide a tower base which does not require tedious, time consuming, and costly assembly with possibility of error.

Prior art tower foundations are generally presented to the customer in the form of plans. The customer then must acquire the materials, cut them, and otherwise prepare them, before assembling the foundation. For people not familiar with the materials, or without the tools to properly manipulate them, this can be a very time-consuming process, with great room for error. It would be advantageous to provide a kit containing all necessary parts for the assembly of a tower foundation.

SUMMARY OF THE INVENTION

The disclosed invention provides an improved foundation for use with wind turbine monopole towers. The innovation accomplishes a significant reduction of material costs and construction labor. The foundation is located below grade, with only a small stub pier exposed, accomplished using a specific concrete forming method and longer anchor bolts. It enhances the use of plain structural concrete by using fiber additives to reduce concrete cracking. It is characterized by a preferred circular (or multi-sided polygonal) cross sectional shape and a stanchion to capture helically arranged reinforcement and precisely locate anchor bolts.

BRIEF DESCRIPTION OF THE DRAWINGS

Features and advantages according to embodiments of the invention will be apparent from the following Detailed Description taken in conjunction with the accompanying drawings, in which.

DETAILED DESCRIPTION OF THE INVENTION

The inventions disclosed herein entail improvements to wind turbine foundation design.

Figure 1:
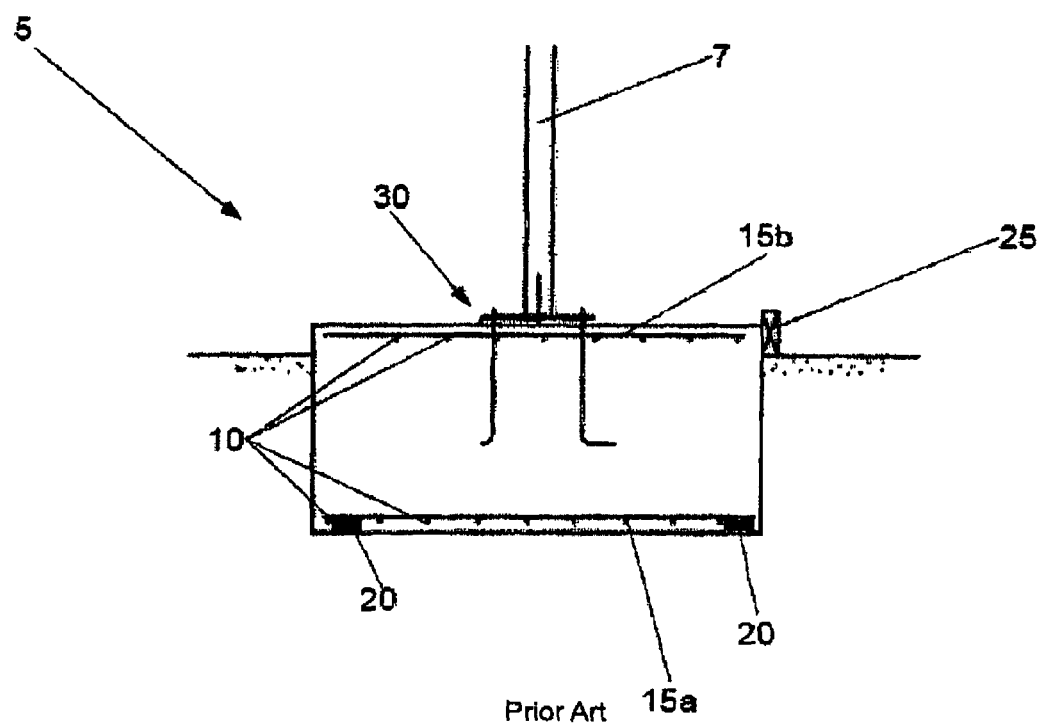
FIG. 1 shows a prior art square foundation using structurally reinforced concrete.
Figure 2:
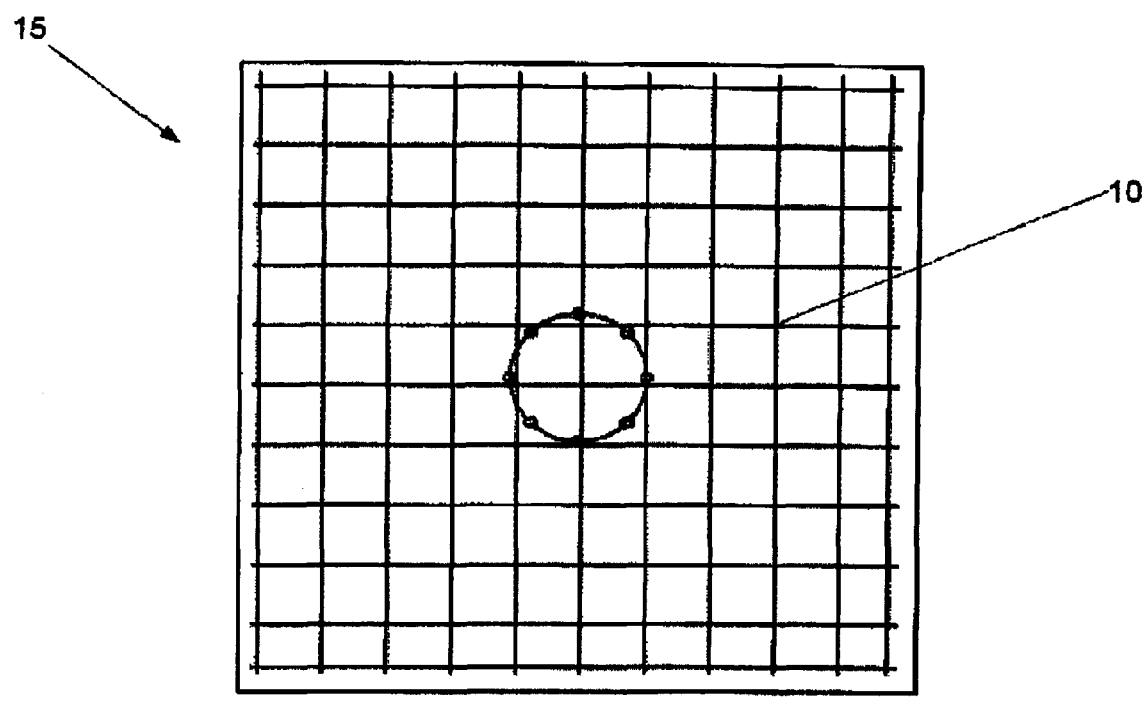
FIG. 2 shows a plan view of a prior art mat foundation.

A prior art mat foundation 5, is shown in FIG. 1. The cross-section, as shown in FIG. 2, is that of a square. A tower 7 is attached to the foundation 5. The foundation width and depth are determined by engineering analyses, taking into consideration the applied loads (overturning moment, side shear and axial force), soil conditions, frost depth, anchor bolt configuration and other factors. Steel reinforcing bars 10 are placed orthogonally a certain distance apart so as to create a reinforcing grid 15a and 15b in both horizontal directions. Detail of the reinforcing bars 10 and the reinforcing grid 15a and 15b are shown in FIG. 2. The bars 10 are fastened together at their intersections using wire ties, as is typical of structurally reinforced concrete. One of the most tedious tasks in constructing the mat foundation 5 is tying the reinforcing bars 10 at their intersections. In a typical installation there are two 9×9 meshes of reinforcing bars 10 accounting for 162 intersections that must be fastened. The bars 10 themselves, being round in cross section, tend to roll about and are difficult to securely fasten.

One such reinforcing grid 15a (see FIG. 1) is placed at the bottom of the excavation, usually several inches above the exposed soil. Placement details are governed by building codes aimed at avoiding corrosion (rust) of the steel from moisture infiltration through the concrete and reducing the likelihood of concrete cracking. The bottom reinforcing mesh 15a is placed on "chairs" (concrete spacer blocks) that elevate it above the soil. Placing the reinforcing grid 15a at the bottom of the foundation 5 is also difficult. Either the chairs 20 must be placed on the base of the excavation in a pattern that will support the reinforcing grid 15a, or the chairs 20 must be attached to the reinforcing grid 15a itself before lowering into the excavation.

It is not possible to conveniently step into the excavation because the reinforcing grid 15a is too narrow to allow placement of a worker's foot in a grid space. Furthermore, experience shows that some of the chairs 20 inevitably break away, leaving concern that the reinforcing grid 15a will settle to the bottom of the excavation under the pressure of the concrete poured on top of it.

A second reinforcing grid 15b is placed near the top of the foundation by suspending it, usually with wires, from form boards 25. Although not quite so onerous as the bottom reinforcing grid 15a, placing the top reinforcing grid 15b is time consuming because it must be suspended by wires from the concrete forms 25. For the baseline mat foundation 1 in the present application, the form boards 25 are also used to suspend an anchor-bolt cage 30, which will later be used to bolt the turbine tower 7 to the foundation.

Figure 3:
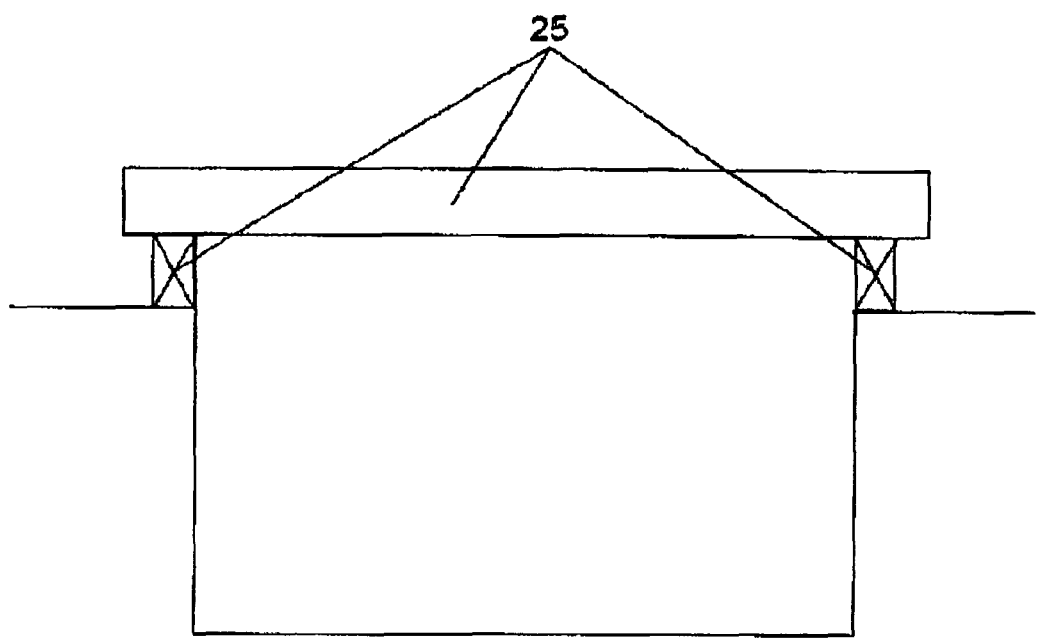
FIG. 3 shows a plan view of prior art foundation forms.

The baseline mat foundation has numerous problems that add to construction time and money. First, the concrete forms 25, using multiple parts shown in FIG. 3, must be constructed, typically using standard dimensional lumber and various fasteners. To obtain the proper dimensions and ensure structural integrity, an effort of several hours is required in addition to the cost of materials. Either before or after the forms 25 are constructed, the foundation excavation must be laid out. Keeping the sides parallel and the layout square, and in cases where a particular alignment is desired, excavation layout can also be time consuming.

Figure 4:
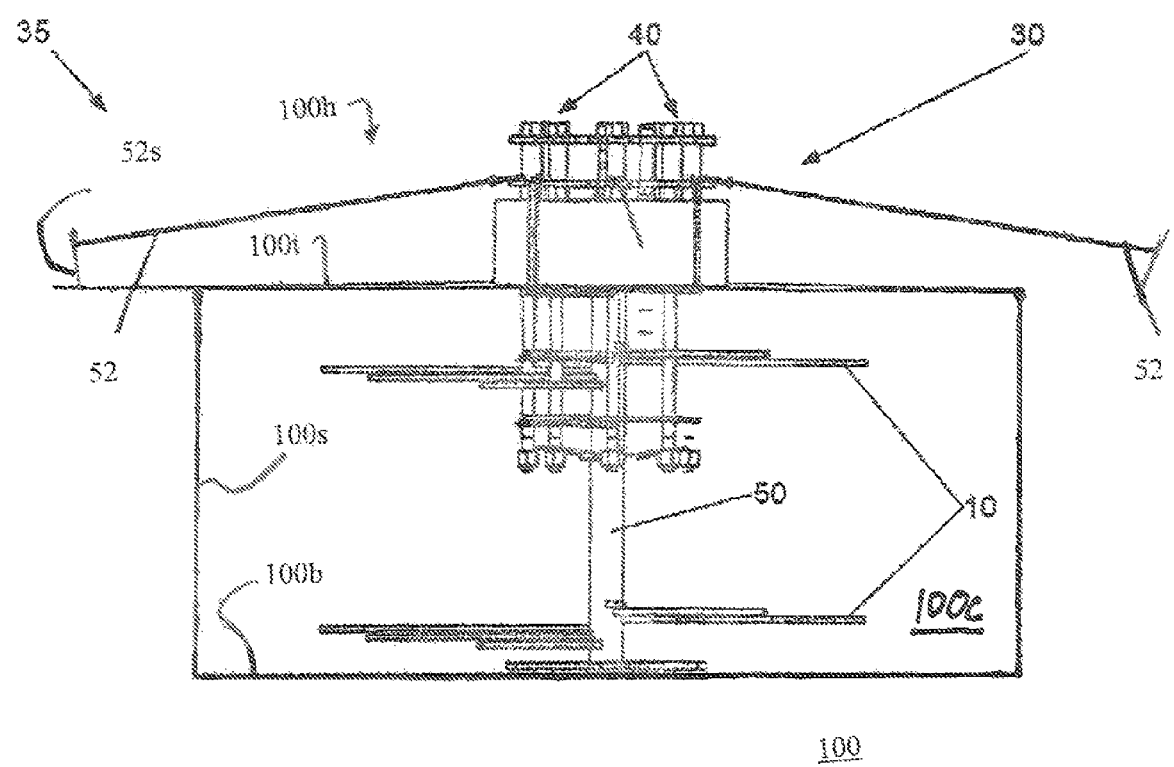
FIG. 4 shows a section view of a circular improved foundation.

The present invention, an improved foundation 35 avoids the many negative aspects of the prior art mat foundation 5. The first innovation, is the use of a circular or near-circular cross-section foundation 35 installed in a hole in the ground 100. The hole 100h is defined by an open top 100t, at least one side 100s, and a bottom 100b. The at least one side 100s extends from the open top 100t to the bottom 100b. As can be appreciated, the hole 100h is eventually filled with concrete 100C as shown in FIG. 4 and explained further herein. In FIG. 4, a tower (not shown) attaches to anchor bolts 40 which are part of an anchor bolt cage 30. The anchor bolt cage 30 connects to a stanchion 50, which supports the entire structure. Optionally, reinforcement bars 10 are attached to the stanchion 50, and are optionally wrapped with a steel cable (not shown in this figure) to provide further reinforcement. Ropes 52 tied off to stakes 52s in the ground or other fastening as apparent to one skilled in the art are used to position the anchor bolt cage 30, the weight of which is supported by a base on the stanchion 50, this is detailed in reference to FIG. 7.

The first advantage of this approach is simplicity of layout. Installation requires identifying the desired tower location, placing a stake in the ground at that location, and use a string to circumscribe a circle of the desired excavation diameter. The extremities of the excavation are marked with additional stakes or spray paint. Digging the excavation by hand is possible. Typical excavation equipment can not dig a circular section, but a polygon is perfectly acceptable. In one possible configuration of the present invention, the polygon is a dodecagon (12 sided polygon) and the straight edges of the polygon are approximately 18 inches wide, resulting in a 72 inch circle circumscribing the polygon. Thus, a back hoe or excavator with an 18" bucket could excavate the foundation in a series of straight lines. This method of using a circular or near circular cross-section foundation 35 requires fewer materials resulting in a lower cost.

Figure 5:
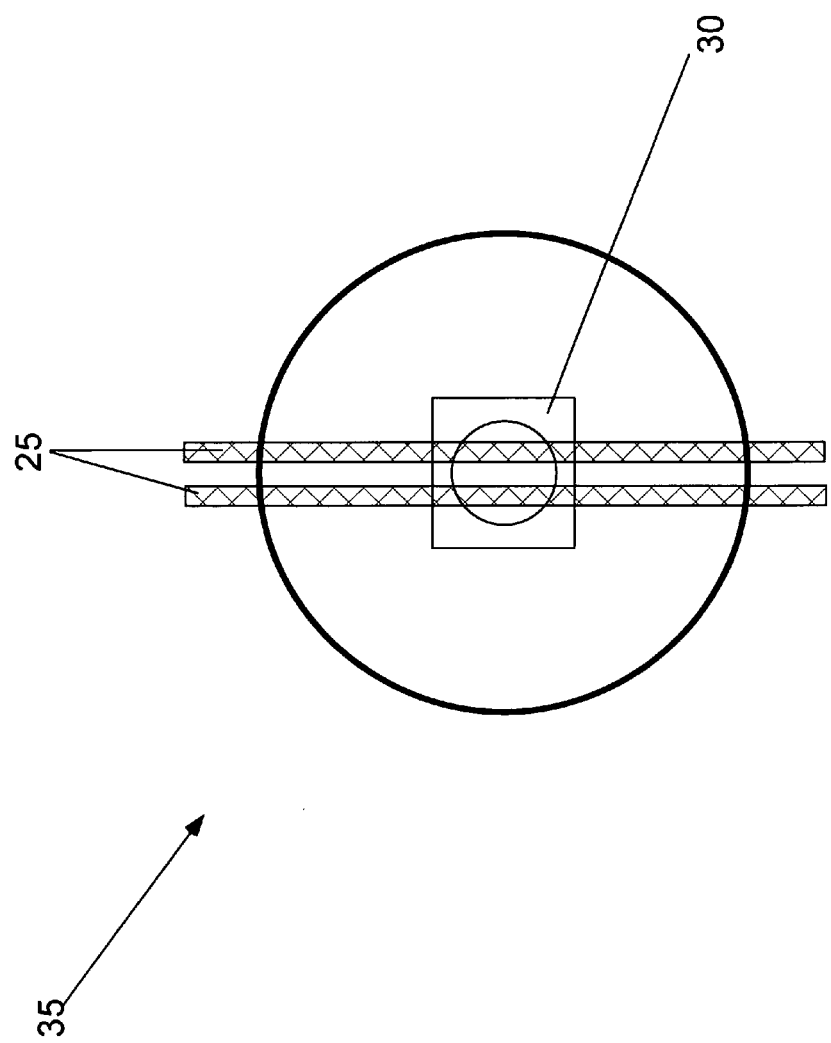
FIG. 5 shows a plan view of an improved foundation, detailing the forms
Figure 6:
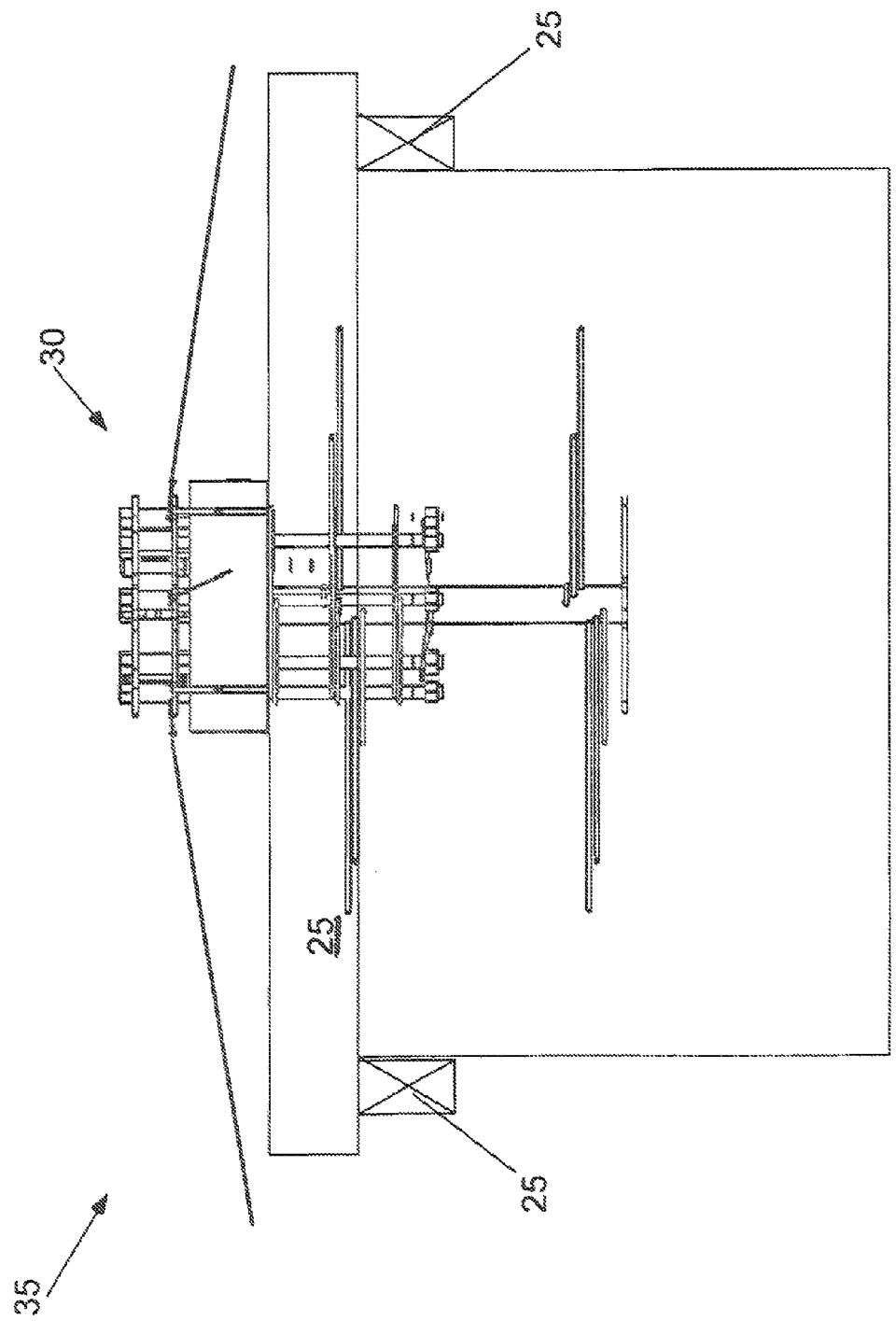
FIG. 6 shows a section view of an improved foundation detailing the forms

The use of concrete forms 25 in prior art foundations requires a significant investment of materials cost and labor hours. Therefore, the present invention does not use extensive forms 25. Forms 25 in the present invention are only used to support anchor bolt cage 30, which extends above the top of the concrete. The concrete is poured to grade level at the extremities of the excavation, unless (a) the slope of the grade precludes this, or (b) edge forms are desired for aesthetic purposes. If forms 25 are used, they are extremely simple to construct and install, again simply laying out the circumference of a circle using thin plywood or steel (landscaping) edging. The improved foundation 35 uses few simple stringers to create a form structure 25, as shown in FIG. 5. A cross-section detailing the form is shown in FIG. 6.

In another possible embodiment, the foundation of the present invention does not use any wood forms. In this embodiment, the excavation is filled with concrete to six inches below grade and then a stub pier surrounding the anchor bolts 40 is filled with concrete to two inches above grade. A section of SONOTUBE™ is used to form the stub pier. The SONOTUBE™ is attached to the anchor bolt templates with brackets. This approach eliminates the need for any wood forms at all.

Figure 7:
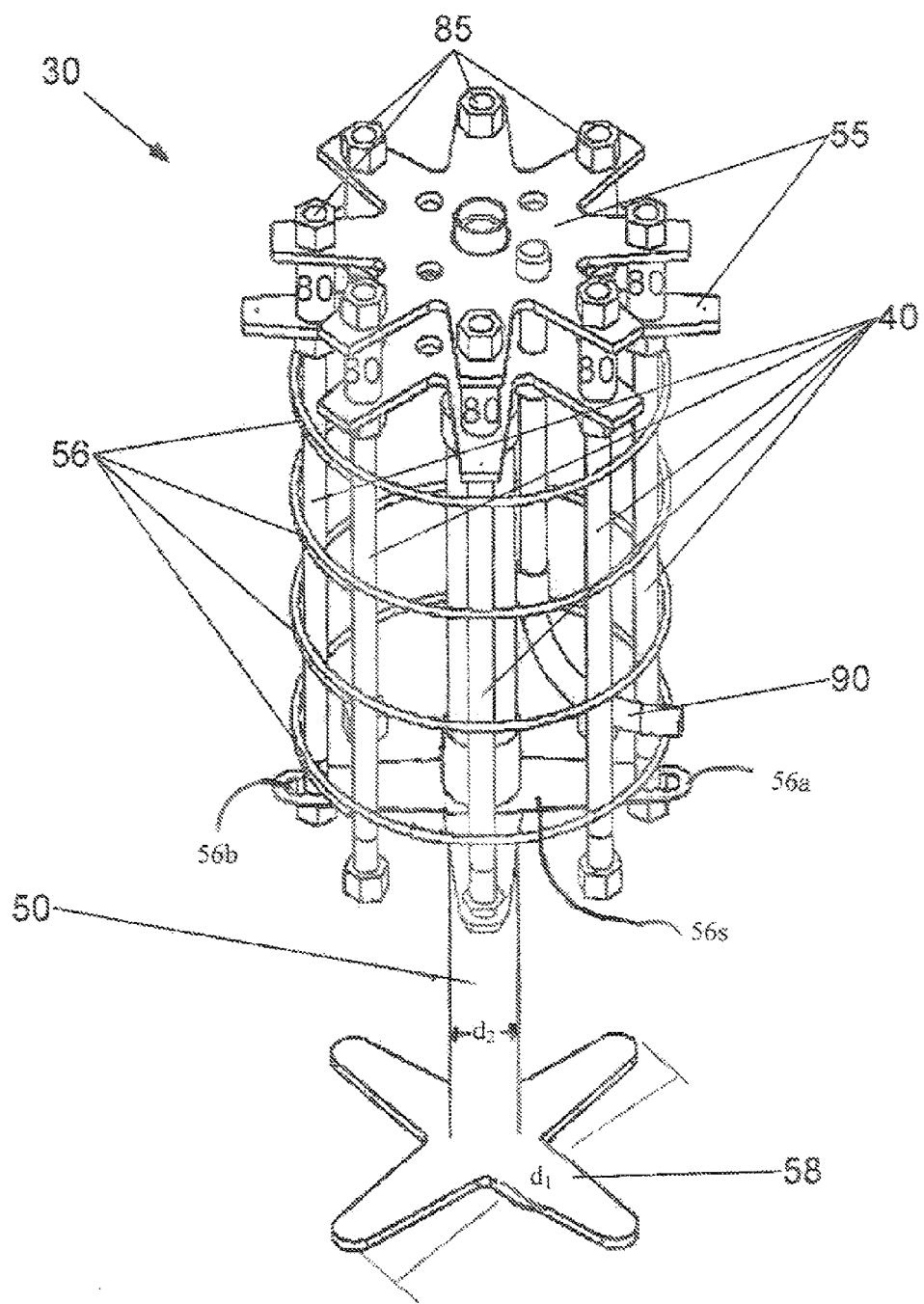
FIG. 7 shows the stanchion, templates, and anchor bolt cage
Figure 8:
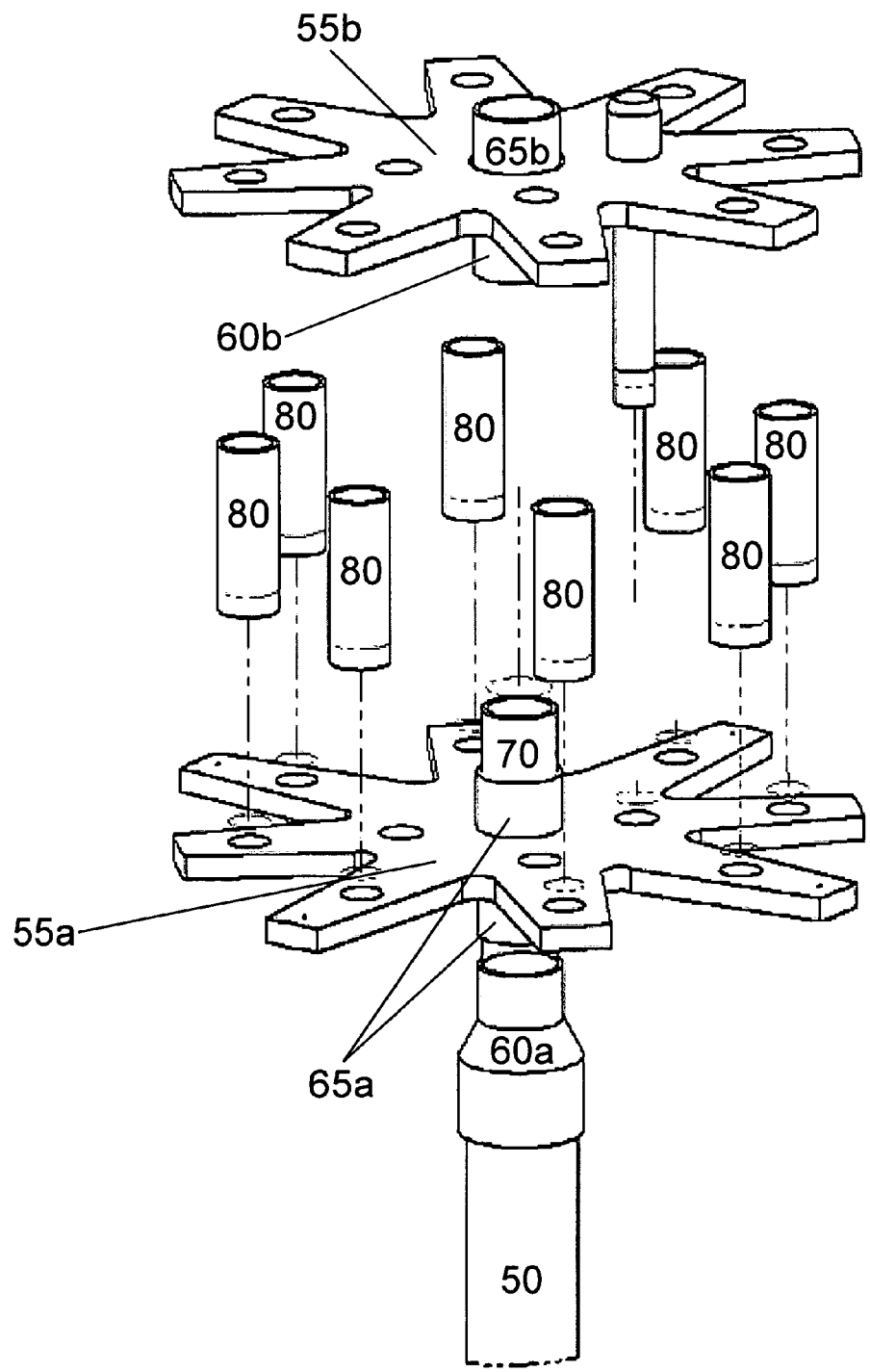
FIG. 8 shows blowout view of the assembly of the bolt cage.

A purpose of the improved foundation 35 is to support a wind turbine tower (not shown), which is bolted to the foundation 35 using anchor bolts 40 embedded in the concrete. Details of an anchor bolt cage 30 assembly are shown in FIGS. 7 and 8. The placement of anchor bolts 40 are shown in FIG. 7. Placing these anchor bolts 40 precisely, and maintaining them in a desired position while concrete is poured, is an important requirement of foundation construction. This is done by using an anchor bolt cage 30, shown in FIG. 7. The precision is accomplished by fastening two anchor bolt templates 55 to the top of the stanchion 50. The anchor bolt cage 30 is then wrapped with one or more circular supports 56 made of rebar or other appropriate material as would be apparent to one of ordinary skill in the art. The circular supports 56 are attached to the anchor bolts using wire ties (not shown) or other types of ties as would be apparent to one of ordinary skill in the art. To facilitate the placement of the anchor bolts 40 and facilitate stability during concrete pouring, the anchor bolts may be secured to the pipe of the stanchion using a stanchion brace 56s. The stanchion brace 56s extends radially from the pipe. The distal ends of the arms 56a have bores 56b, which may be a plurality of bores. The anchor bolts extend through one or more of the bores 56b and may be fitted with nuts such that the anchor bolts are coupled to the stanchion brace 56s to facilitate the placement of the anchor bolts 40. This provides extra support to the structure. The entire structure is held upright by a base 58. Base 58 is shown in an X-shape having extensions in a radial direction having a first dimension $d_1$ larger than a second dimension $d_2$ of the pipe.

Choosing ABS pipe for the stanchion 50 permits the use of standard ABS fittings to secure the templates 55. The stanchion 50 may be formed of other materials or shapes in place of ABS pipe as would be apparent to one of ordinary skill in the art. The templates 55, can be made from ½-inch-thick plywood or other materials such as plastic plate material or sheet metal. In the preferred embodiment, the templates 55 are formed from inch thick plywood. The templates 55 must be made of a material that is sufficiently stiff and sufficiently thick to provide a relatively rigid placement of anchor bolts 40. An assembly sequence for the stanchion and anchor bolts are shown in FIG. 8. If the design of the anchor bolt cage 30 is modified from the embodiment described herein, the assembly sequence may differ from the description below.

First, a female adapter 60a is placed on the top of the stanchion 50 with a threaded end facing up. Next, template 55a is secured to the stanchion 50 by threading a male adapter 65a through a hole in the center of the template and into the female adapter 60a. A short section of ABS pipe 70 is inserted into a female end of the male adapter 65a. A female adapter 60b is then placed on top of the short section of ABS pipe 70. A second template 55b is secured to the stanchion 50 by threading a male adapter 65b through the template 55b and into the female adapter 60b. Anchor bolts 40 are inserted through the two templates 55 with spacers 80 (can be made of short sections of ABS or PVC pipe) in between. Hexagonal nuts 85 (FIG. 7) are fastened to the anchor bolts 40 at the top of the top template 55b and the bottom of the bottom template 55a, thereby creating a rigid cage for the anchor bolts 40 resting atop the stanchion 50. In a similar manner to that described above, rigid non-metallic (PVC) electrical conduit 90 is assembled to the templates 55 so as to provide for electrical wire pull after the concrete is poured.

The assembly in FIG. 7 is necessary for anchor bolt placement, but it is also necessary to hold the entire assembly in place during the concrete pour. This can be done in the following manner (not shown in FIGURES) or using another method as determined by one skilled in the art. The stanchion 50 and anchor bolt cage 30 is first lowered into the excavation—this can be done manually by two or three people, depending upon the quantity and weight of reinforcement. Adjustable guy lines, ratchet straps or other tie-downs 52 (shown in FIG. 4) are used to fasten four anchor bolts 40 to four stakes pounded into the ground. The bolts 40 are chosen to form two opposed pairs (such as north-south and east-west). A carpenter's level is placed on the top of two opposing anchor bolts 40 and the guy lines are adjusted to achieve level in that direction. The procedure is repeated for the two anchor bolts in the direction 90 degrees opposed to the first two. In this manner, the anchor bolts 40 can be leveled and secured prior to pouring concrete.

The entire structure described in the previous figures must be supported by concrete of some form. A foundation using only standard concrete is prone to cracking and other degradation. In prior art this was prevented by using rebar or other structural supports, as is described in FIGS. 1-3. This method has many expensive and tedious elements, as described above. It is possible to avoid the use of all structural reinforcement if fiber reinforced concrete is used.

Fiber reinforced concrete is available through companies such as Propex Concrete Systems under names such as Fibermesh®. Fibermesh® uses fibers which are evenly distributed through the mix of concrete, giving strength to the entire foundation, not just where structural reinforcement exists. The synthetic fibers add tensile strength and prevent cracking. Fibermesh® product is added directly to the concrete as it is mixed, making the use simple, efficient, and cost effective. Using fiber-reinforced concrete for a wind turbine tower, coupled with the above-described method of creating a bolt cage 30 presents an innovation that will help to further the use of wind turbines.

Figure 9:
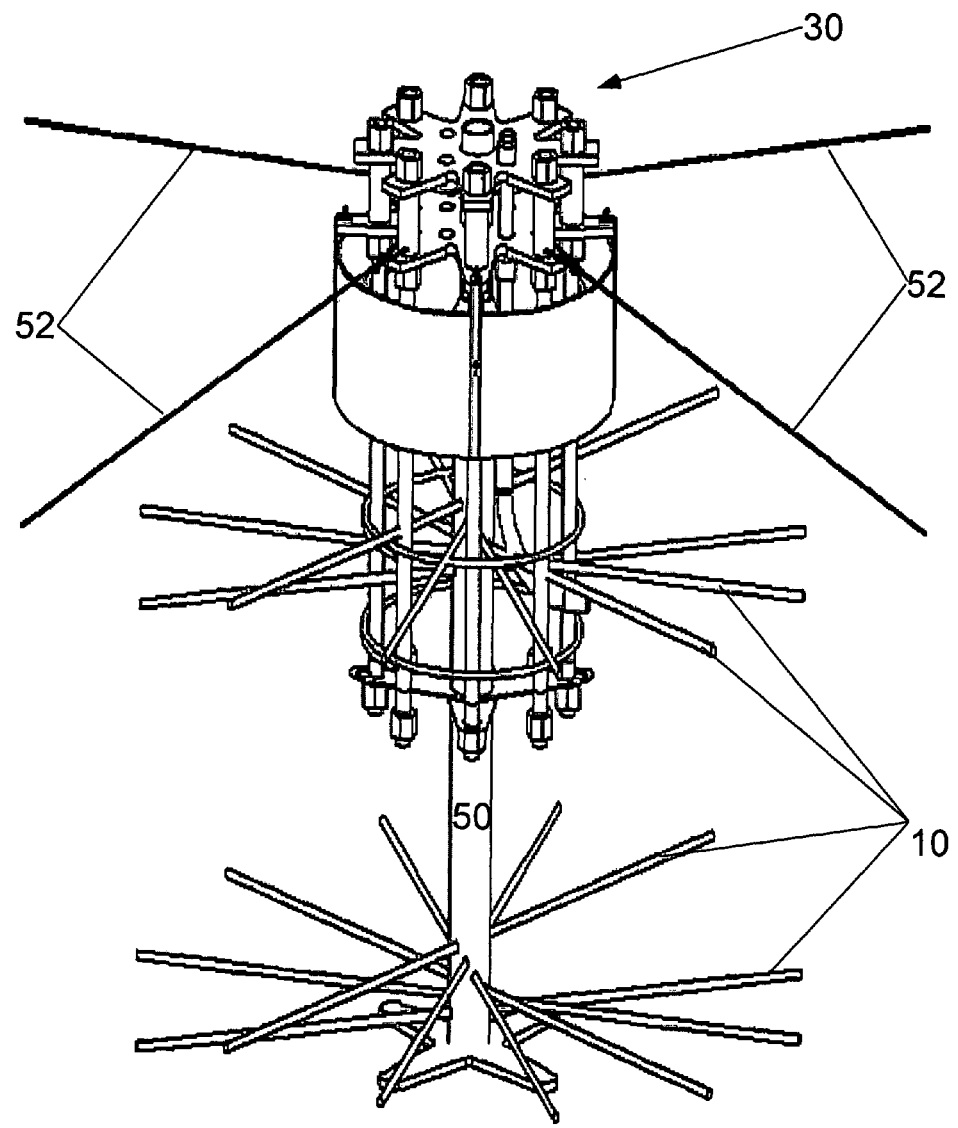
FIG. 9 shows the foundation using a stanchion and reinforcement bars.
Figure 10:
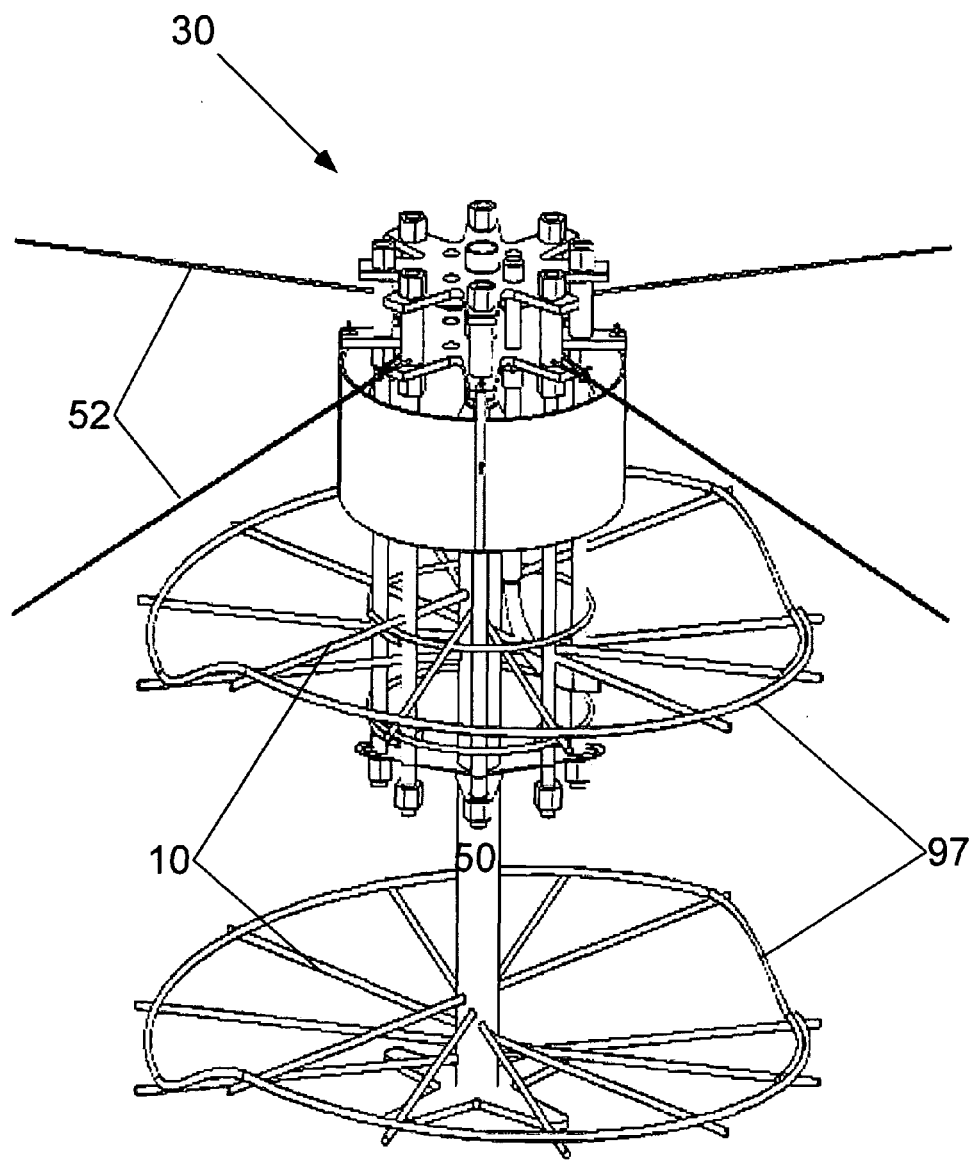
FIG. 10 shows the foundation using a stanchion, reinforcement bars and reinforcement using a steel cable

In some situations, fiber reinforced concrete may not be considered a strong enough option, FIG. 9 and FIG. 10 show methods which can be used to further reinforce the foundation. FIG. 9 shows a stanchion 50 with holes (not shown) drilled in a helical pattern for insertion of reinforcement bars 10 that span the excavation. The diameter, length, spacing, number and material type of the reinforcing bars 10 are determined from structural analyses. As an example, suppose it was decided to use (12) #6 (¾ inch diameter) rebar spaced 30 degrees apart around a 3.5 inch diameter stanchion. The space between drilled hole centerlines located circumferentially around the stanchion would be equal to the circumference of the stanchion divided by twelve, or $\pi(3.5) \div 12 = 0.916$ inches. The vertical separation between the drilled holes 95 could be determined by one of ordinary skill in the art, but to keep the helix as tight as possible, the vertical separation is taken to be the diameter of the reinforcement bars 10. The reinforcement bars may be made of rebar, fiber bars, or other materials as determined by one of ordinary skill in the art. For situations where the materials are to be shipped, lighter material such as fiber bar may be desirable to lower shipping costs.

As an example implementation of the improved foundation 35, the stanchion 50 may be constructed of black ABS plastic, which is inexpensive, readily available and easily fabricated. However, many other materials are possibilities, such as PVC plastic, cast polyurethane and injection molded plastic, and others as determined by one of ordinary skill in the art. The benefit of this design is the simplicity of the stanchion 50 supporting the reinforcement bars 10. For instance, if 12 reinforcement bars 10 are inserted through the stanchion 40 creating 24 segments, reinforcement is distributed uniformly throughout the foundation 35 without the need for wire ties or "chairs" 30. This process can be completed very rapidly.

Use of the round or polygonal foundation shape and the stanchion 50 supporting reinforcement bars 10 serves to simplify assembly and distribute reinforcement uniformly around the foundation. However, this pattern may need amplification to ensure the structural integrity of the concrete and avoid troublesome cracking. Thus, steel cables 97 may be attached to the ends of the reinforcement bars 10 to add further structural integrity as shown in FIG. 10. The steel cables 97 are fastened with cable clamps (not shown) or other fasteners as determined by one of ordinary skill in the art.

The entire improved foundation 35 is designed for easy packaging and shipment as a kit. This allows the end user to purchase all the necessary materials in one place, not requiring costly time and energy to acquire all the necessary parts. The only materials besides the kit that must be procured are the concrete, and optionally some standard lumber if needed for form creation. All other parts are shipped in a convenient box complete with detailed installation instructions. This innovation will make construction of tower foundation cheaper, faster, and easier for both experienced installers and first-time users. This innovation ensures that proper materials will be used, reducing risk of foundation failures. This innovation allows the above-described innovations to be used by many people in need of a simple and strong foundation for mounting a wind turbine or other tower.

There are many useful embodiments of the disclosed invention not all of which have been described specifically in the preceding disclosure but will be evident to one skilled in the art.

What is claimed is:

1. A foundation for a wind turbine comprising:
    a hole excavated in the ground comprising a bottom and at least one side, and an open top;
    a stanchion comprising a base having at least a first dimension; and a pipe having at least a second dimension that is less than the first dimension extending from the base and oriented vertically in said hole, such that said base of said stanchion resting on said bottom of said hole and said pipe located substantially above a center of said bottom of said hole and spaced from said sides of said hole is adapted to extend from said base through said open top;
    a cage attached to said stanchion supporting a set of anchor bolts in a predetermined configuration; and concrete in said hole surrounding said stanchion and said anchor bolts.

2. The foundation of claim 1 wherein said cage orients said anchor bolts in a vertical orientation in predetermined horizontal locations within said foundation.

3. The foundation of claim 2 wherein said cage comprises at least one horizontal plate rigidly attached to said stanchion above the open top of the hole with apertures in the at least one plate through which said anchor bolts can be secured.

4. The foundation of claim 3 further comprising a plurality of forms supporting said cage during installation of said foundation and which are removed from said foundation after installation is complete.

5. The foundation of claim 1 further comprising reinforcement bars attached to said stanchion in a pattern that distributes said reinforcement bars in said foundation to provide structural strength.

6. The foundation of claim 5 wherein said stanchion has holes drilled therein and wherein a piece of said reinforcement bars is inserted in each bole in said stanchion.

7. The foundation of claim 6 wherein said holes are drilled in said stanchion in a helical pattern.

8. The foundation of claim 6 wherein said bars are rebar.

9. The foundation of claim 6 wherein said reinforcement bars are comprised of fiber reinforced composite material.

10. The foundation of claim 6 further comprising a length of steel cable fastened to said reinforcement bars at a location on each reinforcement bar that is distant from the location on the respective reinforcement bar that is inserted in a respective hole in said stanchion.

11. The foundation of claim 1 wherein said concrete comprises fiber reinforcement mixed throughout said concrete.

12. The foundation of claim 11 further comprising reinforcement bars attached to said stanchion in a pattern that distributes said reinforcement bars in said foundation to provide structural strength.

13. The foundation of claim 12 wherein said stanchion has holes drilled therein and wherein a piece of said reinforcement bar is inserted in each hole in said stanchion.

14. The foundation of claim 13 wherein said holes are drilled in said stanchion in a helical pattern.

15. The foundation of claim 1 further comprising structural supports wrapped around, and affixed to, said anchor bolts.

16. The foundation of claim 15 wherein said structural supports are pieces of rebar wrapped around, and affixed to, said anchor bolts.

17. A foundation for a wind turbine comprising:
   a stanchion comprising a pole coupled to a center of a base, the base extending radially from the pole, the stanchion adapted to be oriented vertically in a hole with said base of said stanchion adapted to rest on a bottom of said hole;
   a cage attached to said stanchion for supporting a set of anchor bolts in a predetermined configuration wherein said stanchion and said cage provide a relatively rigid placement of said anchor bolts during construction of said foundation; and
   concrete surrounding said stanchion and said anchor bolts.

18. An apparatus adapted to be placed in a foundation for a wind turbine, the, foundation being a hole filled with concrete, the apparatus comprising:
   a stanchion comprising a pole extending from a base, the pole is adapted to be oriented vertically in the hole, the base comprising at least one extension extending radially from said pole such that the base is adapted to be oriented horizontally in the hole and perpendicular to the pole and adapted to rest on a bottom of the hole;
   a cage attached to the stanchion;
   a support attached to the stanchion between the base and the cage having at least one arm with a bore; and
   a plurality of anchor bolts attached to and supported by the cage and attached to the support in a predetermined configuration.

\* \* \* \* \*